Patented Apr. 15, 1930

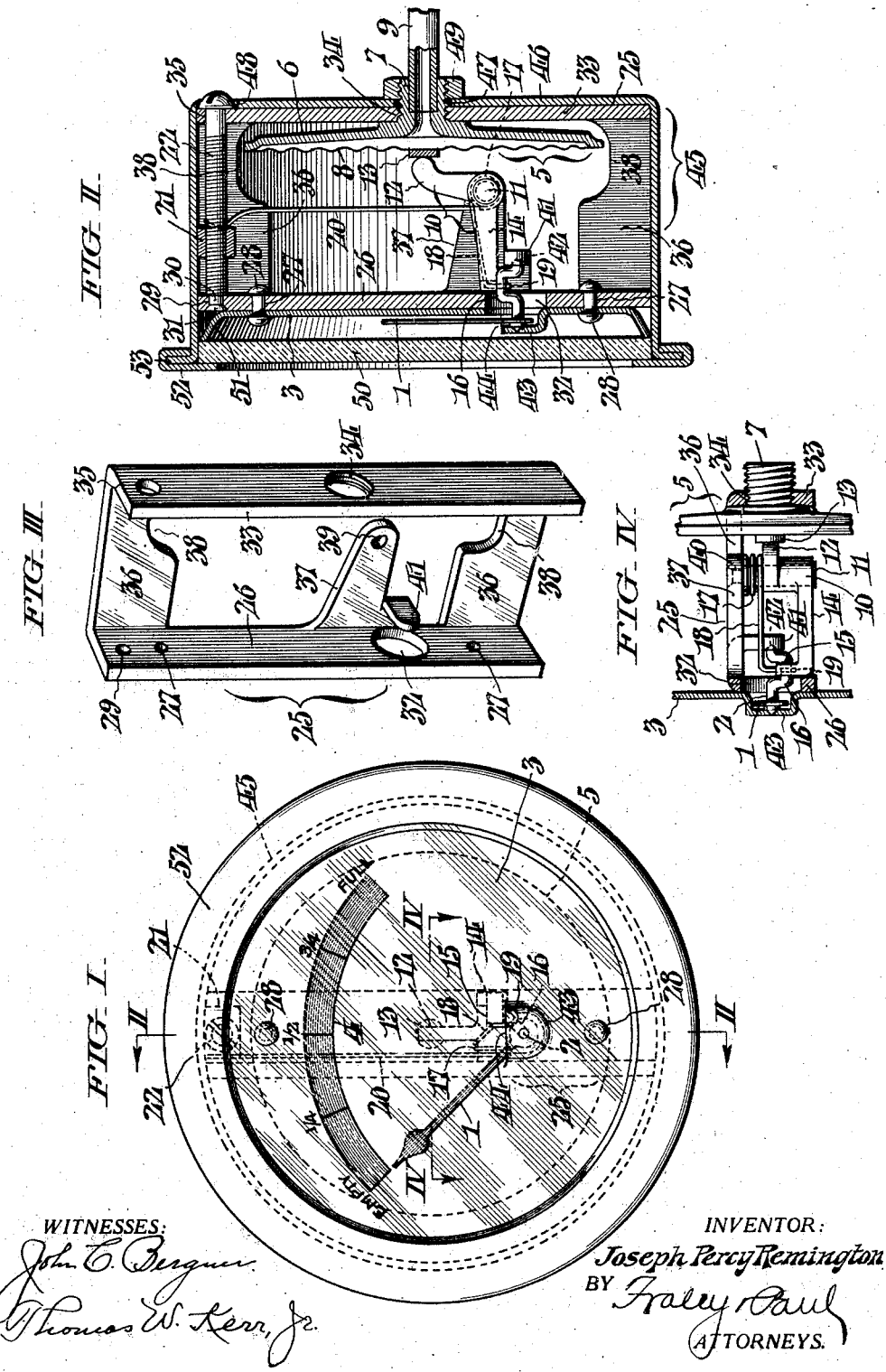

1,754,436

UNITED STATES PATENT OFFICE

JOSEPH PERCY REMINGTON, OF PHILADELPHIA, PENNSYLVANIA

PRESSURE GAUGE

Application filed August 8, 1924, Serial No. 730,834. Renewed July 10, 1929.

This invention relates to pressure gauges, more particularly to a type useful, for example, in connection with systems for indicating the liquid level in gasoline tanks of automobiles, and which employ a trapped head of air or other gas as the pressure responsive measuring medium.

The paramount object of my invention is to enable detection and measurement of very slight or delicate variations in fluid pressure, and to provide an efficient and reliable gauge to meet this requirement.

My invention is otherwise directed to improvements in gauges of the aforementioned type calculated to afford the advantages of structural simplicity and ease of assembling with corresponding economy in manufacturing costs.

How the above desiderata may be attained will be readily apparent from the detailed description, which follows, of a typical embodiment of my invention; the appended claims serving to define those features which I believe to be novel, and wholly within the scope of the present improvements.

With reference to the drawings, Fig. I is a face view of my improved gauge which is here shown on a magnified scale to set forth its details to better advantage.

Fig. II is a sectional view of the same taken as indicated by the arrows II—II in Fig. I.

Fig. III is a perspective illustration of the mounting member whereby the various working parts of the gauge are supported as a complete unit or assemblage; and, Fig. IV is a detail section taken as indicated by the arrows IV—IV in Fig. I.

The indicating pointer of the gauge, designated 1, is fixed to an arbor 2, and arranged to swing over a coordinating dial 3, which, when the gauge is to be employed in systems for measuring the liquid level in tanks such as hereinbefore referred to, may have inscribed thereon an arcuate segment 4 (Fig. I) with subdivisions and markings as shown to indicate the contents of the tank by quarter stages. The pointer 1 is subject to actuation by a pressure responsive means, in this instance, in the form of an aneroid disk 5 comprising a circular back plate 6 with a shouldered and threaded axial projection or boss 7, and a corrugated diaphragm 8 adapted to be influenced by fluid pressure from within, the fluid employed as the measuring medium being conducted to the aneroid disk 5 through a pipe or conduit 9 soldered or otherwise secured fluid-tight in the bore of the boss 7. As a means for transmitting the movement of the diaphragm 8 to the arbor 2 of the pointer 1, I employ a motion-multiplying bell-crank lever 10 arranged to rock upon a fixed stud or fulcrum axis 11. The shorter arm 12 of this lever 10 bears against or directly contacts with a pad 13 affixed centrally of the aneroid diaphragm 8, while its longer arm 14 is laterally extended as shown at 15, to rest upon a crank offset 16 formed in the arbor 2. The action of the aneroid disk 5 is opposed by a spring 17 that is coiled about the fulcrum axis 11 of the bell-crank lever 10, one end 18 of said spring being hooked as at 19 (Figs. I, II and IV) to engage below the crank offset 16 of the arbor 2. The opposite end 20 of the spring 17 extends upward and bears against a nut 21 shiftable back and forth upon an adjusting screw 22. By this construction, it will be seen that the torsion of the spring 12 and hence its resistive effect upon the aneroid disk 5, may be varied as required or desired in meeting the exigencies of each special application. By properly proportioning the diaphragm 8 of the aneroid disk 5 both as to diameter and thickness, and correspondingly designing the spring 17, i. e. by making the same very light, of few turns and just strong enough to offset the possibility of lost motion between the moving parts, the gauge may be made extremely sensitive to very slight pressure variations.

In operation, pressure increases in the measuring medium will cause the corrugated diaphragm 8 of the aneroid disk 5 to move outwardly, such motion being transmitted in a magnified degree, by the bell crank lever 10, to the crank offset 16 of the arbor 2 with the result that the indicating pointer 1 is swung clockwise across the coordinating dial 3 to an extent proportionate to the pressure exerted. With decrease in pressure, the bell crank lever 10 is obliged to follow the recession of the diaphragm 8 under urgence of the spring 17.

Having described the mode of operation of my improved gauge, I will now proceed to explain its novel structural characteristics whereby I not only facilitate the manufacture of its constituent parts, but effect great economy in assembling the same. All the elements previously referred to herein are supported as a complete unit or assemblage by a mounting member which is comprehensively designated 25 and illustrated in perspective in Fig. III of the drawings. This mounting member 25 is preferably formed as a sheet metal stamping, and bent to channel formation as shown. From Fig. II it will be observed that the lateral flange 26 of the mounting member 25 serves as an attaching surface for the dial 3, it being pierced as at 27, 27 to take the securing units 28, 28. The flange 26 is further pierced at the top, as at 29, to provide a bearing for the end of the adjusting screw 22 which end is reduced and shouldered as at 30 for abutment therewith, while the reduced portion is headed over—as at 31—for retainment of said screw against axial displacement. Somewhat above the lower rivet hole 27, the flange 26 also has an opening 32 of ample area to permit free play of the crank offset 16 in the arbor 2. The other flange 33 of the mounting member 25 has a central threaded opening 34 into which the axial boss 7 of the aneroid disk 5 is screwed; and near its top an aperture 35 to afford bearing for the headed end of the adjusting screw 22. The connecting web of the channeled mounting member 25 is cut away at the center as shown, leaving only cross strips 36 respectively at the top and bottom, and intermediate these cross strips, a coplanar lug 37. The connecting portions 36, 36 are recessed adjacent the flange 33 as indicated at 38, 38, to provide the necessary clearance for the aneroid disk 5; while the end of the lug 37 is pierced—as at 39—to take the reduced shouldered end 40 of the stud 11 (Fig. IV) which forms the fulcrum axis of the bell crank lever 10. A tab 41 upset from the lug 37 is countersunk as at 42 to provide a bearing for one of the pointed ends of the arbor 2. The opposite end of the arbor 2 is sustained in a similar manner by an offset or embossment 43 outstanding from the face of the dial 3. From Fig. I, it will be noted that this embossment 43 is substantially semi-circular in outline, the metal being severed along the straight top to provide a slot 44 within which the pointer 1 moves and by which the limit of such movement is fixed.

In assembling, the aneroid disk 5 is first attached by screwing its axial boss 7 into the opening 34 in the flange 33 of the mounting member 25. The adjusting screw 22 is next introduced through the aperture 35 in the flange 33, the nut 21 then applied, and its end 30 finally inserted into the opening 29 in the flange 26 and headed over. At this juncture it is important to note that the nut 21 bears against the upper cross strip 36 and is thereby held against rotating with the screw 21 when the latter is adjusted. The bell crank lever 10, together with the spring 17, is next mounted in position on the fulcrum stud 11; the arbor 2, with pointer 1 attached, inserted through the opening 32 in the flange 26 of the mounting member 25; and the dial 3 thereupon secured in place with the rivets 28. The assembled unit is then inserted into a casing 45 which is preferably made cylindric in form as shown, with its rear end 46 closed except for a central opening 47 to take the axial boss 7 of the aneroid disk 5, and an aperture 48 permitting access to the head of the adjusting screw 22. The insert unit may be conveniently secured in the casing by applying a nut 49 to the protruding end of the boss 7 of the aneroid disk 5. The front of the casing 45 is closed by a glass or crystal 50 superposed upon the dial 3, the necessary space interval for the pointer 1 being determined by a circumferential bevel flange 51 of said dial. The margin of the glass or crystal 50 is overlapped by a retainer ring 52 which is turned over a circumferential flange 53 formed about the open end of the casing 45, and in this way permanently secured. The retainer ring 52 thus also assists in holding the insert assemblage against displacement within the casing 45. The pipe or conduit 9 is of course permanently connected to the gauge only after the latter is fully completed as described.

While my improved gauge is especially useful in fluid level indicating systems such as hereinbefore described, it may obviously be employed in other connections where slight variations in fluid pressure are to be detected and measured.

Having thus described my invention, I claim:

1. A gauge comprising a pointer; a coordinating dial over which the pointer moves; an arbor for the pointer having an integral cranked portion; a motion-multiplying bell-crank having a lateral extension cooperative with the cranked portion; pressure responsive means directly contacting with one arm of the bell-crank to swing the pointer in one direction; and a spring with means for varying its torsion co-operative with the other arm of said bell-crank to oppose the action of the pressure responsive means.

2. A gauge comprising a pointer; a coordinating dial over which the pointer moves; an arbor for the pointer having a cranked offset; a motion-multiplying bell-crank; pressure responsive means directly contacting with one arm of the bell-crank to swing the pointer in one direction; spring means also operative upon said bell-crank to oppose the action of the pressure responsive means; and means whereby the influence of said spring means may be adjusted.

3. A gauge comprising a pointer; a coordinating dial over which the pointer moves; an arbor for the pointer with an integral cranked portion formed therein; pressure responsive means; and a motion-multiplying bell-crank lever having one arm contacting with the pressure responsive means and the other arm laterally extended for engaging the arbor crank to swing the pointer in one direction.

4. A gauge comprising a pointer; a coordinating dial over which the pointer moves; an arbor for the pointer provided with a crank; pressure responsive means; a motion-multiplying bell crank lever operatively connecting the pressure responsive means and the crank to swing the pointer in one direction; means whereto the aforesaid parts are mounted in complete assemblage; a spring to oppose the action of the pressure responsive means, said spring being coiled about the fulcrum axis of the lever and having one end engaging the crank; and means operative upon the other end of the spring whereby the torsional resistance of the latter may be varied.

5. A gauge comprising a pointer; a coordinating dial over which the pointer moves; an arbor for the pointer provided with a crank; pressure responsive means; a motion-multiplying bell crank lever operatively connecting the pressure-responsive means and the crank to swing the pointer in one direction; means whereto the aforesaid parts are mounted to complete assemblage; a spring to oppose the action of the pressure responsive means, said spring being coiled about the fulcrum axis of the lever and having one end engaging the crank; a nut against which the other end of the spring bears; and an engaging screw whereby the nut may be shifted and the torsional resistance of the spring correspondingly varied.

6. A gauge comprising a pointer; a coordinating dial over which the pointer moves; an arbor for the pointer; pressure responsive means directly coordinated with the arbor and actuating the pointer in one direction; a mounting member of channel formation whereby these various parts are supported as a complete assembled unit; a cylindric casing with one end thereof open to receive the assemblage; a crystal adapted to be superposed upon the dial; and a ring bent over a circumferential flange of the casing and marginally lapping the crystal to retain the latter in place and enclose the assemblage permanently within the casing.

7. A gauge comprising a pointer; a coordinating dial over which the pointer moves; an arbor for the pointer provided with a crank; pressure responsive means; a motion multiplying bell-crank lever with one arm abutting the pressure responsive means and the other engaging the aforesaid crank to move the pointer in one direction; a spring to oppose the action of the pressure-responsive means, said spring coiled about the fulcrum axis of the lever and having one end engaging the crank; a nut against which the other end of the spring bears; an engaging screw whereby the nut may be shifted and the torsional resistance of the spring correspondingly varied; and a member for supporting these parts in complete assemblage, said member being in the form of a sheet metal stamping bent to channel formation, one flange thereof serving as an attaching surface for the dial, the other flange for attachment of the pressure responsive element, the two flanges jointly providing bearings for the spring adjusting screw, and the connecting web providing support for the fulcrum axis of the bell crank and bearing for the pointer arbor.

8. A gauge comprising a pointer; a coordinating dial over which the pointer moves; an arbor for the pointer provided with a crank; an aneroid disk with a diaphragm responsive to pressure from within; a bell crank lever with one arm resting against the aneroid diaphragm and the other engaging the crank of the arbor to actuate the pointer; a member whereto these various parts are mounted in complete assemblage, said member being in the form of a sheet metal stamping bent to channel formation, one flange thereof serving as an attaching surface for the dial, the other flange having an aperture to receive an axial boss of the aneroid disk, and the connecting web being cut out centrally to provide a clearance space to accommodate the aneroid disk and affording a lug for sustaining the fulcrum axis of the bell crank lever, said lug having a tab set up therefrom to provide a bearing for the pointer arbor; and a casing to receive the assemblage.

9. A gauge comprising a pointer; a coordinating dial over which the pointer moves; an arbor for the pointer provided with a crank; an aneroid disk with a diaphragm responsive to pressure from within; a bell crank lever with one arm resting against the aneroid diaphragm and the other engaging the crank of the arbor to actuate the pointer; a member whereto these various parts are mounted in complete assemblage, said member being in the form of a sheet metal stamping bent to channel formation, one flange thereof serving as an attaching surface for the dial, the other flange having an aperture to receive an axial boss of the aneroid disk, and the connecting web being cut out centrally to provide a clearance space for accommodating the aneroid disk and affording a lug for sustaining the fulcrum axis of the bell crank lever, said lug having a tab set up therefrom to provide a bearing for the pointer arbor; and a casing to receive the assemblage, said casing being of cylindric configuration with one end closed except for a central opening to permit attachment of a connecting conduit to the axial boss of the aneroid disk.

10. A gauge comprising a pointer; a coordinating dial over which the pointer moves; an arbor for the pointer provided with a crank; an aneroid disk with a diaphragm responsive to pressure from within; a bell crank lever with one arm resting against the aneroid diaphragm and the other engaging the crank of the arbor to actuate the pointer; a member whereto these various parts are mounted in complete assemblage, said member being in the form of a sheet metal stamping bent to channel formation, one flange thereof serving as an attaching surface for the dial, the other flange having an aperture to receive a threaded axial boss of the aneroid disk, and the connecting web being cut out centrally to provide a clearance space for accommodating the aneroid disk and affording a lug for sustaining the fulcrum axis of the bell crank lever, said lug having a tab set up therefrom to provide a bearing for the pointer arbor; and a casing to receive the assemblage said casing being of cylindric configuration with one end closed except for a central opening to permit protrusion of the axial boss of the aneroid disk for application of a nut whereby the assemblage is secured within the casing, and attachment of a connecting conduit.

11. A gauge comprising a pointer; a coordinating dial over which the pointer moves; an arbor for the pointer provided with a crank; an aneroid disk with a diaphragm responsive to pressure from within; a bell crank lever with one arm resting against the aneroid diaphragm and the other engaging the crank of the arbor to actuate the pointer; a member whereto these various parts are mounted in complete assemblage, said member being in the form of a sheet metal stamping bent to channel formation, one flange thereof serving as an attaching surface for the dial, the other flange having an aperture to receive an axial boss of the aneroid disk, and the connecting web being cut out centrally to provide a clearance space for accommodating the aneroid disk and affording a lug for sustaining the fulcrum axis of the bell crank lever, said lug having a tab set up therefrom to provide a bearing for the pointer arbor; a casing to receive the assemblage; a crystal serving as a closure for the casing; and a ring bent over a circumferential flange of the casing to hold the crystal in place.

In testimony whereof, I have hereunto signed my name at Philadelphia, Pennsylvania, this 26th day of July, 1924.

JOSEPH PERCY REMINGTON.